United States Patent [19]

Curtis

[11] 4,031,764

[45] June 28, 1977

[54] DEVICES FOR ROTATING ARTICLES

[75] Inventor: Sidney Curtis, Cottingham, England

[73] Assignee: Thomas Hill Engineering Co. (Hull) Ltd., Hull, England

[22] Filed: Jan. 26, 1976

[21] Appl. No.: 652,531

[52] U.S. Cl. .................................................. 74/57
[51] Int. Cl.² ........................................ F16H 25/12
[58] Field of Search ............................... 74/57, 58

[56] References Cited

UNITED STATES PATENTS

| | | | |
|---|---|---|---|
| 2,872,825 | 2/1959 | Van Doren | 74/57 |
| 3,115,614 | 12/1963 | Habereder | 338/174 |
| 3,731,546 | 5/1973 | MacDonald | 74/57 |

*Primary Examiner*—Samuel Scott
*Assistant Examiner*—Wesley S. Ratliff, Jr.
*Attorney, Agent, or Firm*—Erwin S. Teltscher

[57] ABSTRACT

A device for rotating a plurality of articles is formed with a substantially cylindrical passage, two helical paths being defined along the internal surface thereof; the helical paths are located diametrically opposite one another.

8 Claims, 3 Drawing Figures

U.S. Patent  June 28, 1977  4,031,764

DEVICES FOR ROTATING ARTICLES

BACKGROUND OF THE INVENTION

1. Field of the Invention The present invention relates to a device for rotating articles.

2. Description of the Prior Art.

When processing articles automatic handling apparatus is often used and it is often required to rotate the articles through 90°, 180°, 360°, or intermediate angles. For example, in apparatus for cleaning containers, such as bottles and jars, the containers are turned upside down so that any liquids or contaminants therein are drained or fall out, or are thus prepared for air or liquid treatments under pressure. However, known devices for so rotating the containers are mechanical and may jam, are noisy and are subject to wear. In addition, many such devices are not in line, need excessive space and require gravitational assistance.

Object of the Invention.

It is an object of the present invention to provide a device for rotating articles in which the disadvantages of existing devices are minimized, and in which the containers are kept in line.

SUMMARY OF THE INVENTION

In accordance with the present invention there is provided a device for rotating articles comprising a substantially cylindrical passage having two helical paths defined along the internal surface of the cylindrical passage, the two helical paths being located on said internal surface diametrically opposite with respect to one another.

Preferably, the width of each helical path is substantially equal to the width of a selected part of the article to be rotated. For example, the width of one path may be substantially equal to the width of the base of the article whilst the width of the other path is substantially equal to the width of the top of the article. Alternatively, the paths may correspond in width to that of two spaced intermediate parts of the article and a skid may be provided internally of the cylindrical passage to support the top and bottom of the article.

In a preferred embodiment the two paths are defined by helical grooves cut into the internal surface of the cylindrical passage. Alternatively each path may be defined by two parallel extending runners affixed to said internal surface.

Preferably the cylindrical passage is formed in a cylindrical block of plastics material.

BRIEF DESCRIPTION OF THE DRAWING

Preferred embodiments of the present invention will hereinafter be described, by way of example, with reference to the accompanying drawings, in which.

DESCRIPTION OF THE PREFERRED EMBODIMENTS

Figure 1:
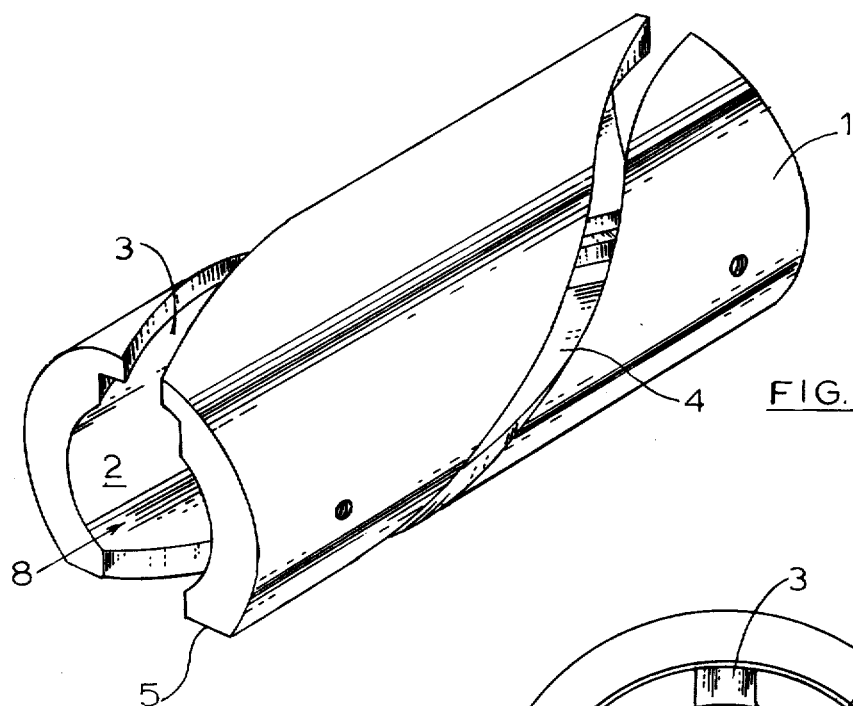
FIG. 1 shows a perspective view of a container-rotating device of the invention.

The device shown in the drawings is described hereinbelow with special reference to the turning of containers such as jars and bottles. However, it is to be understood that the device may be used to rotate any articles as may be required.

Figure 2:
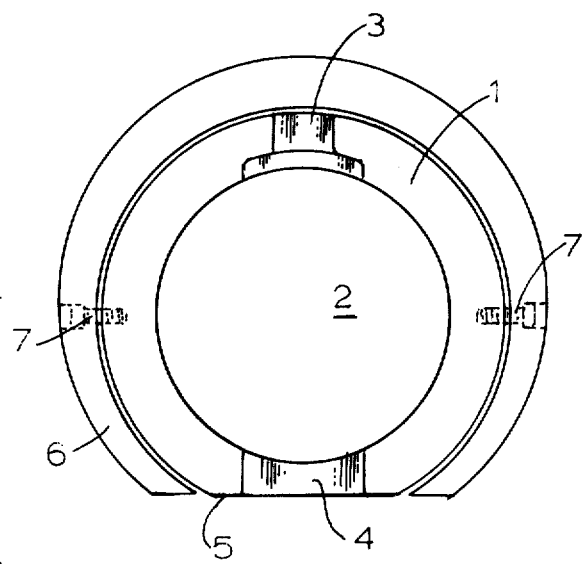
FIG. 2 shows an end view of the device of FIG. 1 showing a yoke holding two halves of the device together.

The device shown in the drawings has a cylinder 1 preferably made of a plastics material such as nylon or P.V.C. (polyvinyl chloride). A cylindrical passage 2 extends through the center of the cylinder and two helical grooves 3 and 4 are cut into the internal surface of the passage 2. The helical grooves 3 and 4 are located diametrically opposite with respect to each other and in the device illustrated, each groove 3 and 4 turns helically through 180°. The bottom portion of the cylinder 1 is cut away to form a flattened bottom surface 5 to allow unrestricted entry of the container. In practice the cylinder 1 is made in two halves and the two halves are held together by means of a yoke 6 (FIG. 2) which is attached by screws 7 to the cylinder 1.

In use the device is mounted by any suitable means so that the flattened portion 5 is just above a conveyor belt (not shown) or other feed device which carries containers towards the device. As a container enters the device, in the direction of arrow 8 in FIG. 1, the bottom thereof engages in the groove 4 whilst the top thereof engages in the groove 3. The device is made to correspond to the dimensions of the particular containers to be handled and the grooves are accurately machined so that the width of the groove 3 corresponds to the width of the container near the top thereof, whilst the width of groove 4 corresponds to the width of the container near the bottom thereof. Additionally, the diametric distance between the grooves 3 and 4 will be substantially equal to the height of the container. As the container is pushed through the device by the head of containers behind it on the conveyor belt, the bottom thereof is guided along the groove 4, whilst the top thereof is guided along the groove 3. In the device illustrated the container will have been turned through 180° when it emerges from the other end of the device and is deposited onto the same or a further conveyor belt, or onto a dead plate. Of course, the helical grooves may turn through any angle required, for example, they may extend through 360° if it is simply required to allow liquid drops to fall from the upturned container, and then to turn the containers the correct way up again for their further processing.

As there are no mechanical parts in the device, and as it corresponds to the dimensions of the container to be handled, there is no risk of jamming within the device and noise is considerably reduced. Additionally, the device has a relatively short length.

Figure 3:
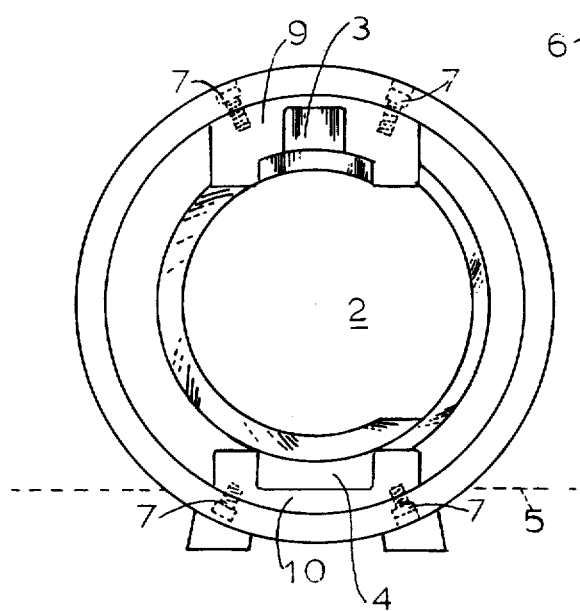
FIG. 3 shows an end view of FIG. 1 with an internal runner affixed to the device.

In a further embodiment of the invention the helical grooves 3 and 4 are not cut into the internal surface of the cylindrical passage 2 but are each formed by two parallel extending upstanding runners 9 and 10, as shown in FIG. 3, which are affixed to the internal surface of an appropriately sized cylindrical drum.

In the case of bottles and similar tall containers it may be inconvenient to provide a device such as that illustrated, as the diameter of the cylindrical passage will have to correspond to the height of the container. In this instance, the two helical grooves may extend to the outer surface of the cylinder and may correspond in width to two spaced intermediate parts of the container. The container will then extend through the cylinder and will be rotated in a similar manner to that described above by the guided passage of the two intermediate parts of the container in the helical grooves therefor. In this instance a helical or arcuate skid may be provided beneath or around the cylinder and spaced therefrom to support the container as it traverses the cylinder.

It has been found that the device of the present invention may be used for high speed operation and will handle more than 300 containers per minute. If it is required to turn the containers through 180° and then return them to their original position, the same device may be used, the containers being sent through the device in a first direction to turn them, and then passed through another similar device reversed in orientation with respect to the conveyor, so that they are returned to their original position.

Although the invention has been described with respect to a preferred version thereof, it is to be understood that it is not to be so limited since changes can be made therein which are within the full intended scope of the appended claims.

What is claimed is:

1. A longitudinal device of a predetermined length for rotating a plurality of articles, wherein each of the articles has base and top portions, respectively, said device being formed with two separate half-portions held together by a substantially cylindrical yoke, said device a substantially cylindrical longitudinal passage having an internal surface, two helical paths being defined in said device along said internal surface, said helical paths being located on said internal surface diametrically opposite one another along the entire length of said device, the width of one of said paths being substantially equal to the width of said base portion, and the width of the other of said paths being substantially equal to the width of said top portion.

2. A device according to claim 1 further comprising at least one skid, attachable thereto, wherein each of the articles has two spaced intermediate portions having first and second breadths respectively, and wherein the width of said paths correspond substantially to said first and second breadths, respectively.

3. A device according to claim 1 wherein said helical paths are helical grooves.

4. A device according to claim 1 further comprising at least one runner affixed to said internal surface defining one of said two helical paths.

5. A device according to claim 4 further comprising a second runner affixed to said internal surface, extending parallel to the first runner and defining the other of said two helical paths.

6. A device according to claim 1 wherein at least a portion of said device is a synthetic plastic-material cylindrical block formed with said cylindrical passage.

7. A device according to claim 1 wherein each of said paths turns helically through at least 180°, and wherein the article is a bottle or the like.

8. A method of rotating a plurality of bottles, each of the bottles having base and top portions, respectively, comprising the steps of:

transporting the bottles along a conveyor belt; and engaging the base and the top portions of each of the bottles with first and second helical paths, respectively, defined in a longitudinal device of predetermined length along the surface of a substantially cylindrical passage within the device, each of the helical paths turning through at least 180°, whereby each of the bottles is rotated through at least 180° upon emerging from the passage.

* * * * *

UNITED STATES PATENT OFFICE
CERTIFICATE OF CORRECTION

Patent No. 4,031,764　　　　　　　　Dated　June 28, 1977

Inventor(s) Sydney Curtis

It is certified that error appears in the above-identified patent and that said Letters Patent are hereby corrected as shown below:

Inventor's name should be corrected to read --Sydney Curtis--.

Claim 1, line 6, following "device" add --being formed with--.

*Signed and Sealed this*

*Sixth* Day of *December 1977*

[SEAL]

*Attest:*

RUTH C. MASON　　　　　LUTRELLE F. PARKER
*Attesting Officer*　　　　*Acting Commissioner of Patents and Trademarks*